(12) United States Patent
Sugai et al.

(10) Patent No.: US 10,957,332 B2
(45) Date of Patent: Mar. 23, 2021

(54) ACOUSTIC CHARACTERISTIC MEASUREMENT DEVICE AND METHOD

(71) Applicant: ALPINE ELECTRONICS, INC., Tokyo (JP)

(72) Inventors: Taku Sugai, Iwaki (JP); Nozomu Saito, Iwaki (JP); Jyoji Yamada, Iwaki (JP)

(73) Assignee: ALPINE ELECTRONICS, INC., Tokyo (JP)

( * ) Notice: Subject to any disclaimer, the term of this patent is extended or adjusted under 35 U.S.C. 154(b) by 217 days.

(21) Appl. No.: 16/292,731

(22) Filed: Mar. 5, 2019

(65) Prior Publication Data
US 2019/0287543 A1 Sep. 19, 2019

(30) Foreign Application Priority Data

Mar. 18, 2018 (JP) .............................. JP2018-050296

(51) Int. Cl.
| | | |
|---|---|---|
| *G06F 17/00* | (2019.01) | |
| *G10L 19/018* | (2013.01) | |
| *G01H 7/00* | (2006.01) | |
| *H04R 29/00* | (2006.01) | |
| *H04S 7/00* | (2006.01) | |

(52) U.S. Cl.
CPC ............ *G10L 19/018* (2013.01); *G01H 7/00* (2013.01); *H04R 29/001* (2013.01); *H04S 7/30* (2013.01)

(58) Field of Classification Search
CPC .......... H04S 7/301; H04S 7/302; H04S 7/303; H04S 7/305
See application file for complete search history.

(56) References Cited

U.S. PATENT DOCUMENTS

| | | | | |
|---|---|---|---|---|
| 2007/0086597 A1* | 4/2007 | Kino | ................... | H04S 7/301 381/59 |
| 2010/0135118 A1* | 6/2010 | Van Leest | ............... | H04S 7/301 367/124 |

(Continued)

FOREIGN PATENT DOCUMENTS

| | | |
|---|---|---|
| EP | 1 514 450 | 3/2005 |
| EP | 2 899 997 | 7/2015 |

(Continued)

OTHER PUBLICATIONS

Akira, Nishimura, "Information Confidentiality Technology with respect to Acoustic Signal", Journal of Japan Acoustical Society, vol. 63, No. 11, (2007), p. 660-667.

(Continued)

*Primary Examiner* — Joseph Saunders, Jr.
(74) *Attorney, Agent, or Firm* — Brinks Gilson & Lione (57) ABSTRACT

An acoustic characteristic measurement device includes a speaker configured to output an acoustic signal in which a watermark signal is embedded; a microphone configured to perform sound collection with respect to the acoustic signal output from the speaker in a predetermined listening position; and an acoustic characteristic measurement unit configured to determine an acoustic characteristic of an acoustic space from the speaker to the listening position, on the basis of the watermark signal embedded in the acoustic signal which is subjected to the sound collection by the microphone.

19 Claims, 9 Drawing Sheets

(56) References Cited

U.S. PATENT DOCUMENTS

| | | | | |
|---|---|---|---|---|
| 2013/0058492 A1* | 3/2013 | Silzle | ............... | H04R 3/005 |
| | | | | 381/59 |
| 2014/0079223 A1* | 3/2014 | Nguyen | ............... | G10K 11/002 |
| | | | | 381/18 |
| 2016/0014511 A1* | 1/2016 | Sheen | ............... | H04R 29/008 |
| | | | | 381/98 |
| 2017/0019748 A1* | 1/2017 | Cheon | ............... | H04R 29/007 |
| 2017/0245087 A1* | 8/2017 | Baba | ............... | H04S 7/301 |
| 2018/0020314 A1* | 1/2018 | Sheen | ............... | H04S 7/308 |

FOREIGN PATENT DOCUMENTS

| | | |
|---|---|---|
| EP | 3 292 703 | 11/2016 |
| EP | 3 211 921 | 8/2017 |
| JP | 2008-209491 | 9/2008 |

OTHER PUBLICATIONS

Office Action for EP 19 162 714.0 dated Jul. 10, 2020, 5 pgs.
Extended European Search Report for 19162714.0 dated May 14, 2019, 7 pgs.

* cited by examiner

ACOUSTIC CHARACTERISTIC MEASUREMENT DEVICE AND METHOD

RELATED APPLICATION

The present application claims priority to Japanese Patent Application Number 2018-050296, filed Mar. 18, 2018, the entirety of which is hereby incorporated by reference.

BACKGROUND

1. Field of the Invention

The present invention relates to an acoustic characteristic measurement device and method of measuring an acoustic characteristic between a speaker provided in a vehicle or the like, and a listening position.

2. Description of the Related Art

From the related art, an acoustic processing device calculating an impulse response from a speaker to a listening point (a listening position) by using a time-stretched pulse (TSP) signal or a sine wave signal, has been known (for example, refer to JP 2008-209491 A). In a case of using the TSP signal, the impulse response is obtained by being subjected to sound collection by a microphone. The impulse response is an acoustic characteristic of a sound or voice output from each of the speakers to the listening point, and thus, is used for adjusting a delay time of the sound or voice output from each of the speakers for original sound reproduction, or for correcting a frequency characteristic. In addition, in a case of using the sine wave signal, the impulse response from the speaker to the listening point is calculated by outputting the sine wave signal for each frequency, and by detecting a rising edge of a measured sound wave form which is obtained by performing the sound collection with the microphone, or by performing system identification.

However, in the acoustic processing device disclosed in JP 2008-209491 A described above, a measurement signal such as the TSP signal or the sine wave signal is output from the speaker and is subjected to the sound collection by the microphone, and thus, it is not possible to measure the acoustic characteristic from the speaker to the microphone while the speaker or the microphone is used in a normal operation (at the time of a normal operation). It is possible to measure the acoustic characteristic by outputting the measurement signal described above from the speaker before or after the normal operation, or by pausing the normal operation, but a time only for measurement is required, and the measurement signal is a sound which is not relevant to a voice or music, and thus, there is a concern that a user may feel discomfort.

SUMMARY

The present disclosure has been made in consideration of such circumstances, and an object thereof is to provide an acoustic characteristic measurement device and method in which it is possible to measure an acoustic characteristic in parallel with a normal operation, and to prevent a user from feeling discomfort since a time only for measurement is not required.

In order to attain the object described above, an acoustic characteristic measurement device of the present disclosure includes: a speaker configured to output an acoustic signal in which a watermark signal is embedded; a microphone configured to perform sound collection with respect to the acoustic signal output from the speaker in a predetermined listening position; and an acoustic characteristic determination unit configured to determine an acoustic characteristic of an acoustic space from the speaker to the listening position, on the basis of the watermark signal embedded in the acoustic signal which is subjected to the sound collection by the microphone.

In addition, an acoustic characteristic measurement method of the present disclosure includes: outputting an acoustic signal in which a watermark signal is embedded, from a speaker; performing sound collection with respect to the acoustic signal output from the speaker in a predetermined listening position, by a microphone; and determining an acoustic characteristic of an acoustic space from the speaker to the listening position, on the basis of the watermark signal embedded in the acoustic signal which is subjected to the sound collection by the microphone, by an acoustic characteristic determination unit.

The acoustic characteristic of the acoustic space from the speaker to the microphone is measured by using the watermark signal, and thus, it is possible to perform a normal operation using the acoustic signal and a measurement operation of the acoustic characteristic in parallel with each other, and a time only for measuring the acoustic characteristic is not required. In addition, the watermark signal is embedded in the acoustic signal, and thus, a user is not particularly conscious of a signal for measuring the acoustic characteristic, and it is possible to prevent the user from feeling discomfort.

In addition, it is desirable that the acoustic characteristic measurement device further includes a watermark signal timing notification unit configured to provide notification of an output timing when the watermark signal embedded in the acoustic signal is output from the speaker, and the acoustic characteristic determination unit determines the acoustic characteristic according to the notification of the watermark signal timing notification unit. The timing when the watermark signal is output from the speaker is known, and thus, it is possible to measure the acoustic characteristic of the acoustic space from the speaker to the microphone based on the timing when the watermark signal is output from the speaker.

In addition, it is desirable that the acoustic characteristic determination unit includes a watermark embedment position determination unit configured to detect an embedment position of the watermark signal in the acoustic signal subjected to the sound collection by the microphone, and a delay time calculation unit configured to calculate a delay time of the acoustic signal in the acoustic space, as the acoustic characteristic, on the basis of the notification of the watermark signal timing notification unit and a determination result of the watermark embedment position determination unit. Accordingly, it is possible to obtain the delay time as a difference between the output timing when the watermark signal is output from the speaker, and a timing when the watermark signal reaches the embedment position of the watermark signal included in the acoustic signal which is subjected to the sound collection by the microphone.

In addition, it is desirable that the watermark embedment position determination unit detects the embedment position of the watermark signal by calculating a mutual correlation between the acoustic signal subjected to the sound collection by the microphone and the watermark signal. The mutual correlation between the acoustic signal and the watermark signal is maximized at a timing when the watermark signal embedded in the acoustic signal is subjected to the sound collection by the microphone, and thus, it is possible to know the embedment position of the watermark signal in the acoustic signal subjected to the sound collection on the basis of a calculation result of the mutual correlation.

In addition, it is desirable that the watermark signal timing notification unit provides notification of a first timing when the output of the watermark signal from the speaker is completed, the watermark embedment position determination unit determines a second timing when capturing of the watermark signal in the microphone is completed by detecting the embedment position of the watermark signal, and the delay time calculation unit calculates a difference between the first timing and the second timing as the delay time. Accordingly, it is possible to measure a time from a time point when the output of the watermark signal from the speaker is ended to a time point when the capturing of the watermark signal in the microphone (the sound collection) is ended as the delay time.

In addition, it is desirable that the watermark signal timing notification unit includes a time when the watermark signal is output from the speaker, in the watermark signal, as the output timing. An output time is included in the watermark signal, and thus, it is not necessary to provide notification of the same type of information in another system, and it is possible to simplify the configuration.

In addition, it is desirable that the acoustic characteristic determination unit includes a watermark signal extraction unit configured to extract the watermark signal embedded in the acoustic signal which is subjected to the sound collection by the microphone, and a frequency response function calculation unit configured to calculate a frequency response function as the acoustic characteristic, on the basis of a first watermark signal as the watermark signal included in the acoustic signal output from the speaker, and a second watermark signal as the watermark signal extracted by the watermark signal extraction unit. In this case, it is possible to calculate an acoustic transmission characteristic of the acoustic space by checking two types of watermark signals to be input and output, before and after the acoustic space from the speaker to the microphone.

In addition, it is desirable that the frequency response function calculation unit calculates the frequency response function by calculating a discrete Fourier transform of each of the first watermark signal and the second watermark signal. In particular, it is desirable that the frequency response function calculation unit calculates a discrete Fourier transform of each of the first watermark signal and the second watermark signal, by fast Fourier transform. Accordingly, it is possible to obtain the acoustic transmission characteristic indicating a change in a frequency and a phase when the acoustic signal passes through the acoustic space.

In addition, it is desirable that the watermark signal timing notification unit provides notification of a third timing when the output of the watermark signal from the speaker is started, and the frequency response function calculation unit calculates a frequency response function from the first watermark signal and the second watermark signal according to the third timing. Accordingly, it is possible to reliably know the contents of the change in the frequency or the like of the acoustic signal after the acoustic signal is output to the acoustic space.

In addition, it is desirable that the watermark signal is generated by using a spectrum spreading method. In particular, it is desirable that the watermark signal is generated by multiplying predetermined data and pseudorandom number sequence data together. Accordingly, it is possible to use the watermark signal in which signal components are dispersed in a wide frequency band, to further prevent the user from feeling discomfort with respect to a component of a specific frequency, and to measure a delay time corresponding to a wide frequency band or the acoustic characteristic such as the frequency response function.

In addition, it is desirable that the acoustic characteristic measurement device further includes an acoustic signal storage unit configured to store the acoustic signal in which the watermark signal is embedded, and an acoustic signal output unit configured to read out the acoustic signal from the acoustic signal storage unit and to output the acoustic signal from the speaker. In particular, it is desirable that the acoustic signal storage unit stores the acoustic signal which is prepared in advance and of which contents are not changed every time when the acoustic signal is read out. Accordingly, it is possible to prepare in advance the acoustic signal suitable for the measurement of the acoustic characteristic.

In addition, it is desirable that the acoustic characteristic measurement device further includes an embedment propriety determination unit configured to determine the propriety of the embedment of the watermark signal according to input of an acoustic signal to be embedded as an acoustic signal before the watermark signal is embedded, and an acoustic signal preparation unit configured to prepare the acoustic signal by embedding the watermark signal in the acoustic signal to be embedded, which is determined as suitable for the embedment of the watermark signal by the embedment propriety determination unit. Accordingly, it is possible to select the acoustic signal to be embedded, which is suitable for the measurement of the acoustic characteristic, from the acoustic signals used in the normal operation at each time.

In addition, it is desirable that the embedment propriety determination unit determines that the acoustic signal to be embedded is suitable for the embedment of the watermark signal, in a case in which a level of a frequency component with respect to an audible band is greater in the acoustic signal to be embedded than in the embedded signal. Accordingly, it is possible to reliably mask the watermark signal to be used for measuring the acoustic characteristic.

DETAILED DESCRIPTION OF THE PREFERRED EMBODIMENTS

Hereinafter, an acoustic characteristic measurement device of one embodiment to which the present invention is applied will be described with reference to the drawings.

Figure 1:
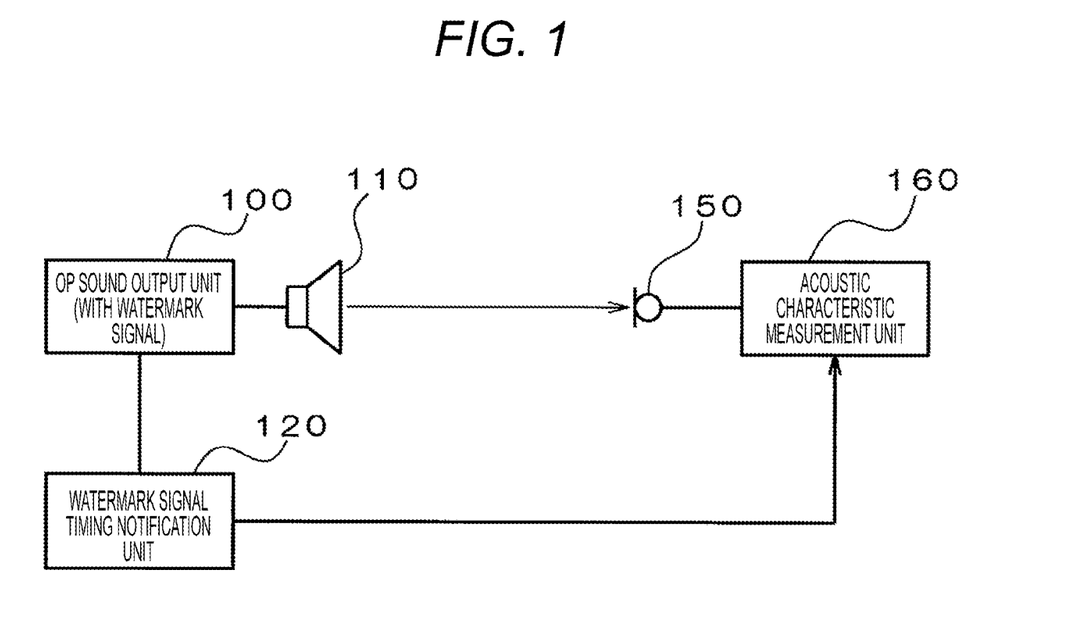
FIG. 1 is a diagram illustrating a schematic configuration of an acoustic characteristic measurement device of the present disclosure.

FIG. 1 is a diagram illustrating a schematic configuration of an acoustic characteristic measurement device of the present invention. As illustrated in FIG. 1, the acoustic characteristic measurement device includes an opening (OP) sound output unit 100, a speaker 110, a watermark signal timing notification unit 120, a microphone 150, and an acoustic characteristic measurement unit 160. The opening sound output unit 100 corresponds to an acoustic signal output unit, the acoustic characteristic measurement unit 160 corresponds to an acoustic characteristic determination unit, and the watermark signal timing notification unit 120 corresponds to a watermark signal timing notification unit.

The acoustic characteristic measurement device may be part of an onboard device mounted on a vehicle, and an opening sound output unit, a speaker, or a microphone used for an application other than the measurement of an acoustic characteristic may be used for the measurement of the acoustic characteristic as the opening sound output unit 100, the speaker 110, or the microphone 150.

The opening sound output unit 100 outputs a predetermined opening sound. For example, in a case of using a voice or a sound effect to be output at the same time as an initial screen is displayed at the time of activation, in the onboard device including a navigation device, an audio device, or the like, when an accessory switch of the vehicle is turned on, and a power source is turned on, in a case of using a voice for providing notification of the insertion of an ETC card which is output from an ETC onboard machine or the like, it is assumed that an acoustic signal of which the contents are not changed every time when the acoustic signal is output is used as the opening sound. In addition, the watermark signal is embedded in advance in the opening sound.

A watermark signal, for example, corresponding to a "spectrum spreading method" described in the following literature, can be used as the watermark signal: Akira, NISHIMURA, "Information Confidentiality Technology with respect to Acoustic Signal", Journal of Japan Acoustical Society, Vol. 63, No. 11, (2007), p. 660-667

In particular, the contents of the opening sound described above are known (fixed), and an opening sound in which the watermark signal is embedded may be prepared and stored, and the stored opening sound may be read out and output from the speaker 110, instead of an opening sound which has been used from the related art. In addition, a watermark signal prepared by the spectrum spreading method described above is spread over a wide frequency range, and thus, in order for a user not to be conscious of such a watermark signal by masking the watermark signal, it is also necessary to select an opening sound having a frequency component over a wide frequency range, in a portion in which at least the watermark signal is embedded.

In addition, the speaker 110 and the microphone 150 are provided in a predetermined position where the acoustic characteristic is measured in an acoustic space. For example, in a case that the acoustic characteristic (an acoustic transmission characteristic) to be used in an equalizer device, an active noise canceler (ANC) or the like is measured, the speaker 110 connected to such devices, or the microphone 150 provided in the vicinity of a listening position of the user, is used. Alternatively, in a case where a temporal difference until an audio sound output from each of a plurality of speakers reaches the listening position of the user is corrected, in the audio device or the like, the speaker 110 connected to the audio device or the microphone 150 provided in the vicinity of the listening position of the user is used.

The watermark signal timing notification unit 120 notifies the acoustic characteristic measurement unit 160 of an output timing when the watermark signal embedded in the opening sound (the acoustic signal) output from the opening sound output unit 100 is output from the speaker 110.

Figure 2:
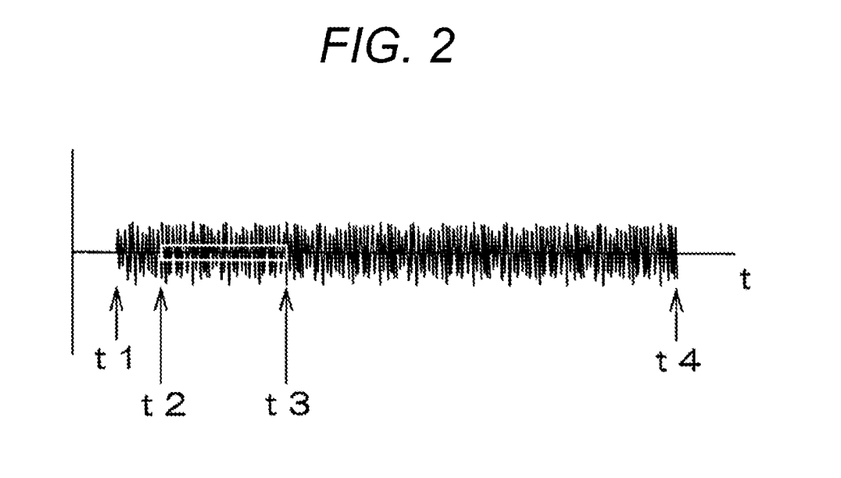
FIG. 2 is a diagram illustrating a relationship between an opening sound and an embedment position of a watermark signal.

FIG. 2 is a diagram illustrating a relationship between the opening sound and an embedment position of the watermark signal. The horizontal axis represents an elapsed time t, and the vertical axis represents a signal level of the opening sound. In addition, an output start time point of the opening sound is set to t1, an output completion time point of the opening sound is set to t4, an output start time point of the watermark signal embedded with a predetermined time length is set to t2, and an output completion time point of the watermark signal is set to t3. The watermark signal timing notification unit 120 provides notification of at least one of the output start time point t2 and the output completion time point t3 of the watermark signal as the output timing.

The acoustic characteristic measurement unit 160 determines (measures) the acoustic characteristic of the acoustic space from the speaker 110 to the microphone 150 on the basis of the watermark signal embedded in the acoustic signal (the opening sound) which is subjected to sound collection by the microphone 150, according to the notification of the watermark signal timing notification unit 120.

In this embodiment, (1) a delay time until the acoustic signal output from the speaker 110 reaches the microphone 150, and (2) the acoustic transmission characteristic of the acoustic space (a frequency response function) are considered as the acoustic characteristic which is a measurement target, and hereinafter a measurement method of each of the acoustic characteristics will be described in detail.

(1) Measurement of Delay Time

Figure 3:
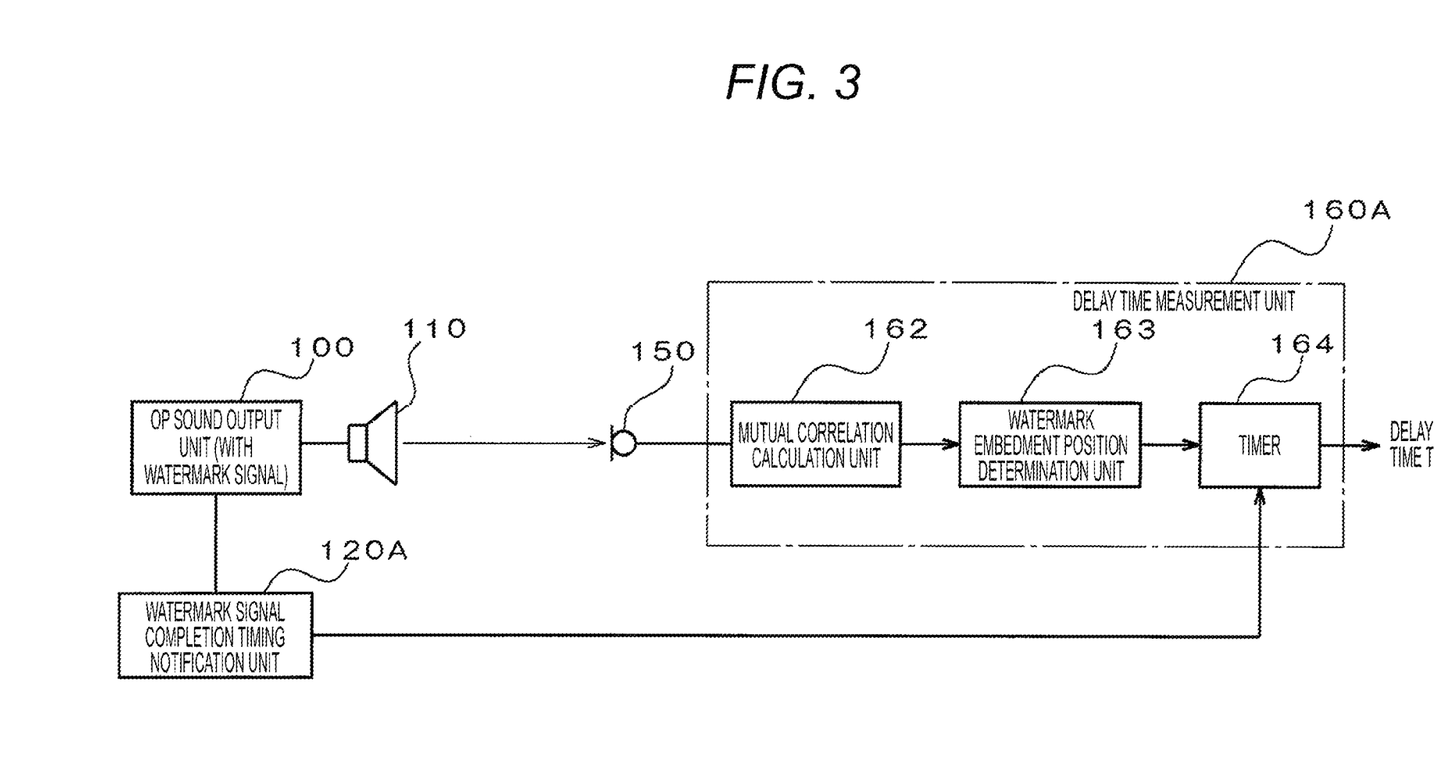
FIG. 3 is a diagram illustrating the configuration of the acoustic characteristic measurement device measuring a delay time.

FIG. 3 is a diagram illustrating the configuration of the acoustic characteristic measurement device measuring the delay time. The same reference numerals will be applied to the same components as those of FIG. 1, and the description thereof will be omitted except for when it is necessary. In addition, similar reference numerals will be applied to components corresponding to the components illustrated in FIG. 1.

The acoustic characteristic measurement device illustrated in FIG. 3 includes the opening (OP) sound output unit 100, the speaker 110, a watermark signal completion timing notification unit 120A, the microphone 150, and a delay time measurement unit 160A.

As described above, the watermark sound is embedded in advance in the opening sound output from the opening sound output unit 100, and thus, it is not necessary to perform a process of embedding the watermark sound each time, but in order to make it easy to understand the process of extracting the watermark sound from the opening sound which is subjected to the sound collection by the microphone 150, initially, the process of embedding the watermark sound in the opening sound will be simply described.

Figure 4:
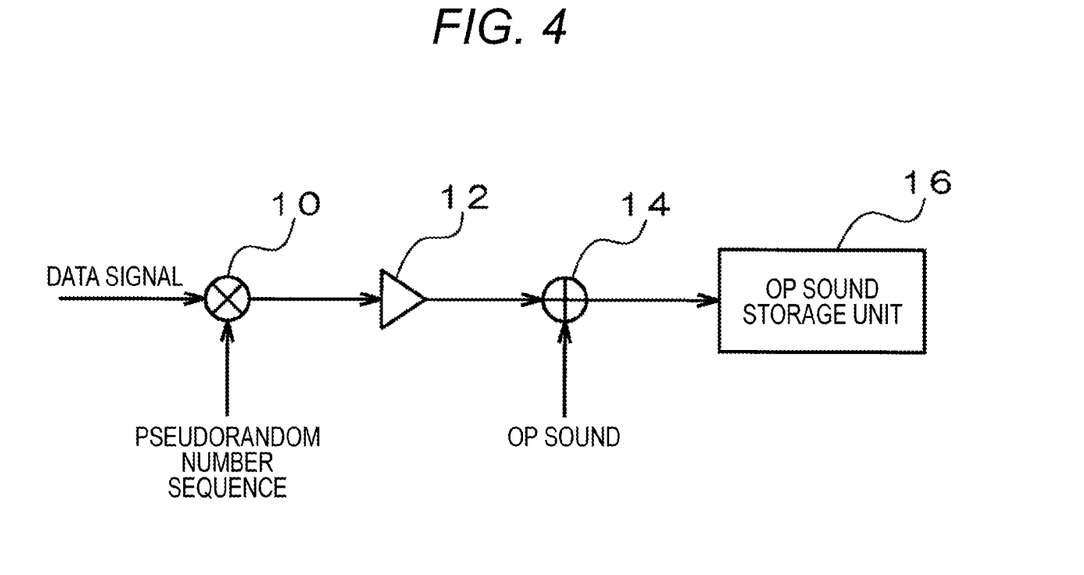
FIG. 4 is a diagram illustrating a process of embedding the watermark sound in the opening sound.

FIG. 4 is a diagram illustrating the process of embedding the watermark sound in the opening sound. The watermark signal is generated by multiplying data of a predetermined number of bits (for example, information for identifying the speaker 110, or the like) and a pseudorandom number sequence, which is a key for signalizing and decoding for spectrum spreading, together with a multiplier 10, and then, the level of the watermark signal is adjusted with a level adjuster 12 such that the watermark signal is masked with the opening sound, and the opening sound is added to the watermark signal with an adder 14. Thus, the opening sound on which the spread watermark signal is superimposed (FIG. 2) is prepared. For example, the data to be input indicates bit information by an amplitude of 1 or −1 for each of eight samples, and in a case where the number of bits of the data is set to 6 and a data rate length of one bit is set to 50 ms in eight samples, in the entire data of 6 bits, an embedment time length of the watermark signal is 300 ms, in 48 samples. Furthermore, in the pseudorandom number sequence, 1 or −1 is allocated for each sample, and the data and the pseudorandom number sequence are multiplied in sample unit by the multiplier 10.

The opening sound prepared as described above is stored in the opening (OP) sound storage unit 16. The opening sound output unit 100 illustrated in FIG. 1 or FIG. 3 reads out the opening sound after the watermark sound is embedded from the opening sound storage unit 16, and outputs the opening sound from the speaker 110. The opening sound storage unit 16 described above corresponds to an acoustic signal storage unit.

Next, returning to FIG. 3, a measurement operation of the delay time of the delay time measurement unit 160A will be described. The delay time measurement unit 160A measures the delay time of the acoustic signal in the acoustic space from the speaker 110 to the microphone 150 on the basis of the watermark signal embedded in the opening sound which is subjected to the sound collection by the microphone 150, according to the notification of the watermark signal completion timing notification unit 120A.

As illustrated in FIG. 3, the delay time measurement unit 160A includes a mutual correlation calculation unit 162, a watermark embedment position determination unit 163, and a timer 164. The watermark signal completion timing notification unit 120A corresponds to a watermark signal timing notification unit, the mutual correlation calculation unit 162 and the watermark embedment position determination unit 163 correspond to a watermark embedment position determination unit, and the timer 164 corresponds to a delay time calculation unit.

The mutual correlation calculation unit 162 calculates a mutual correlation between the opening sound subjected to the sound collection, which is output from the microphone 150, and the pseudorandom number sequence used for preparing the watermark signal embedded in the opening sound. As described above, in a case where the watermark signal includes the bit data of 48 samples, a correlation value of 48 samples is calculated while shifting a target portion of the opening sound by one sample by one sample.

The watermark embedment position determination unit 163 determines the target portion in which the correlation value calculated by the mutual correlation calculation unit 162 is maximized as the embedment position of the watermark signal in the opening sound.

Figure 5:
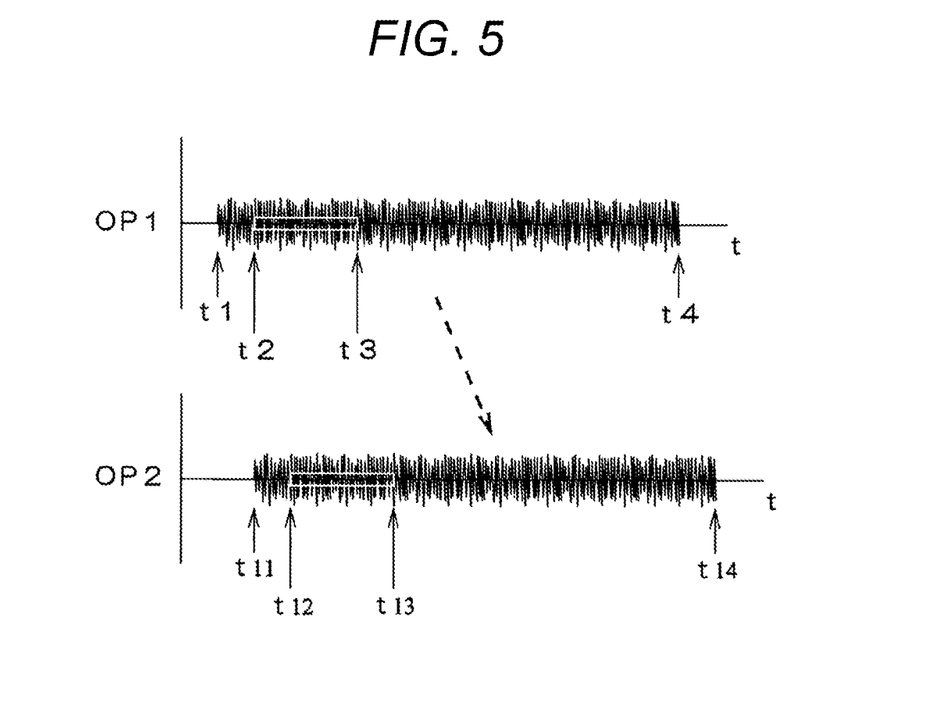
FIG. 5 is a diagram illustrating the embedment position of the watermark signal in the opening sound, reaching a microphone.

FIG. 5 is a diagram illustrating the embedment position of the watermark signal in the opening sound reaching the microphone 150. In FIG. 5, OP1 is the opening sound output from the speaker 110 and is identical to that illustrated in FIG. 2. The output of the opening sound OP1 from the speaker 110 is started at a time point of t1, and the output of the watermark signal is started at a time point of t2. After that, the output of the watermark signal is completed at a time point of t3, and the output of the opening sound OP1 is completed at a time point of t4. Thus, in a case where the delay time of the acoustic signal from the speaker 110 to the microphone 150, is set to T, the opening sound OP1 in which the watermark signal is embedded, is output from the speaker 110 and reaches the microphone 150 with a delay of the time T.

In FIG. 5, OP2 is the opening sound subjected to the sound collection, which is output from the microphone 150. The opening sound OP2 is started at a time point of t11 (=t1+T), and is ended at a time point of t14 (=t4+T). On the other hand, the watermark signal embedded in the opening sound OP2, is started at a time point of t12 (=t2+T), and is ended at a time point of t13 (=t3+T).

The mutual correlation to be calculated by the mutual correlation calculation unit 162 is maximized at the time point of t13 when the output of the watermark signal is ended, and the watermark embedment position determination unit 163 determines t13 as the embedment position of the watermark signal and outputs detection notification of the watermark signal to the timer 164.

When the output of the embedded watermark signal is completed while the opening sound OP1 is output from the speaker 110 (the time point of t3 in FIG. 2 or FIG. 5), the watermark signal completion timing notification unit 120A outputs output completion notification of the watermark signal to the timer 164.

The timer 164 starts counting at the time point t3 when the output completion notification of the watermark signal is input from the watermark signal completion timing notification unit 120A, and after that, stops the counting at the time point t13 when the detection notification of the watermark signal is input from the watermark embedment position determination unit 163, and thus, measures the time T from the start to the end of the counting (t13−t3=(t3+T)−t3=T). The time T is output from the delay time measurement unit 160A as the delay time T until the opening sound output from the speaker 110 reaches the microphone 150.

Thus, in the acoustic characteristic measurement device of this embodiment, the delay time T as the acoustic characteristic of the acoustic space from the speaker 110 to the microphone 150 is measured by using the watermark signal, and thus, it is possible to perform the normal operation using the acoustic signal and the measurement operation of the acoustic characteristic in parallel with each other, and a time only for measuring the acoustic characteristic is not required. In addition, the watermark signal is embedded in the acoustic signal, and thus, the user is not particularly conscious of the signal for measuring the acoustic characteristic, and it is possible to prevent the user from feeling discomfort.

In particular, it is possible to obtain the delay time as a difference between the output timing when the watermark signal is output from the speaker 110, and the timing when the watermark signal reaches the embedment position of the watermark signal included in the acoustic signal which is subjected to the sound collection by the microphone 150.

Figure 6:
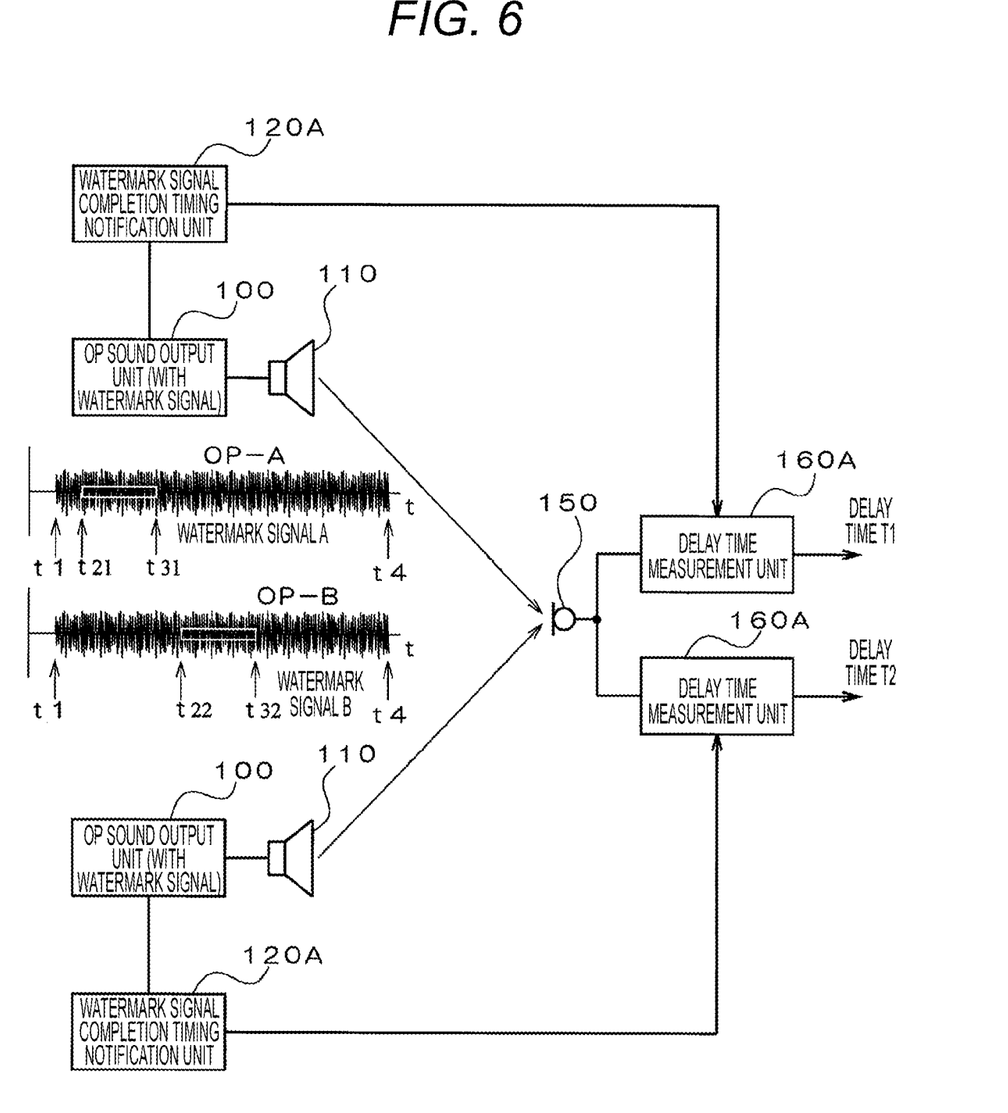
FIG. 6 is a diagram illustrating a modification example of measuring the delay time.

FIG. 6 is a diagram illustrating a modification example of measuring the delay time. An acoustic characteristic measurement device illustrated in FIG. 6 measures delay times T1 and T2 of an acoustic signal from each of two speakers 110 (for example, a set of speakers provided on the right and left of the vehicle) to the microphone 150, and includes an opening sound output unit 100 and the watermark signal completion timing notification unit 120A corresponding to each of two speakers 110.

In addition, a watermark signal A embedded in an opening sound OP-A, which is output from the speaker 110 by one opening sound output unit 100, and a watermark signal B embedded in an opening sound OP-B, which is output from the speaker 110 by the other opening sound output unit 100, are set by being shifted such that embedment positions of each of the watermark signals do not overlap with each other. Furthermore, in the watermark signal A and the watermark signal B, the contents of the data items to be input to the multiplier 10 illustrated in FIG. 4 are different from each other, and the contents of the pseudorandom number sequences to be used for preparing the watermark signals A and B are different from each other.

One delay time measurement unit 160A measures the delay time T1 of the acoustic signal from one speaker 110 to the microphone 150 on the basis of the watermark signal A embedded in the opening sound OP-A. In addition, the other delay time measurement unit 160A measures the delay time T2 of the acoustic signal from one speaker 110 to the microphone 150 on the basis of the watermark signal B embedded in the opening sound OP-B.

Furthermore, in the configuration illustrated in FIG. 6, a combination of two speakers 110 and one microphone 150 has been described, but the same applies to a combination of three or more speakers and one microphone 150, or a combination of one or a plurality of speakers and two or more microphones, and it is possible to extend the configuration illustrated in FIG. 6.

However, in a case where the number of speakers 110 increases (in a case of the multiple speakers), there is a concern that a plurality of watermark signals to be prepared corresponding to the number of speakers 110 do not fall within the opening sound. In such a case, the delay time may be measured with respect to a part of the speakers 110 at the time of the first opening sound output, and the delay time may be measured with respect to the remaining speakers 110 at the time of the second and the subsequent opening sound outputs, such as the next activation. For example, such control of separately performing the delay time measurement (the selection of the opening sound output unit 100 and the delay time measurement unit 160A for performing the delay time measurement) is performed by a control unit (not illustrated).

In addition, in a case where the delay time is measured with respect to each of the plurality of speakers 110, arithmetic processings are performed in parallel with each other in a plurality of delay time measurement units 160A, but in a case where the number of speakers 110 increases, an arithmetic amount of a processor performing the arithmetic processing, such as a digital processing device (DSP), increases, and thus, it is necessary to use an expensive processor. For this reason, as with a case of the multiple speakers described above, the number of delay time measurement units 160A simultaneously performing the arithmetic processings may be reduced by separately performing the arithmetic processing a plurality of times. Even in such a case, the control of separately performing the delay time measurement (the selection of the opening sound output unit 100 and the delay time measurement unit 160A for performing the delay time measurement) is performed by a control unit (not illustrated).

In addition, in such a case, in the first opening sound and the second and the subsequent opening sounds, it is not necessary to shift the embedment position of the watermark signal, or to change the contents, and the same watermark signal may be used. Accordingly, it is possible to reduce the number of delay time measurement units 160A to be connected to the microphone 150, that is, a processing load required for measuring the delay time.

Figure 7:
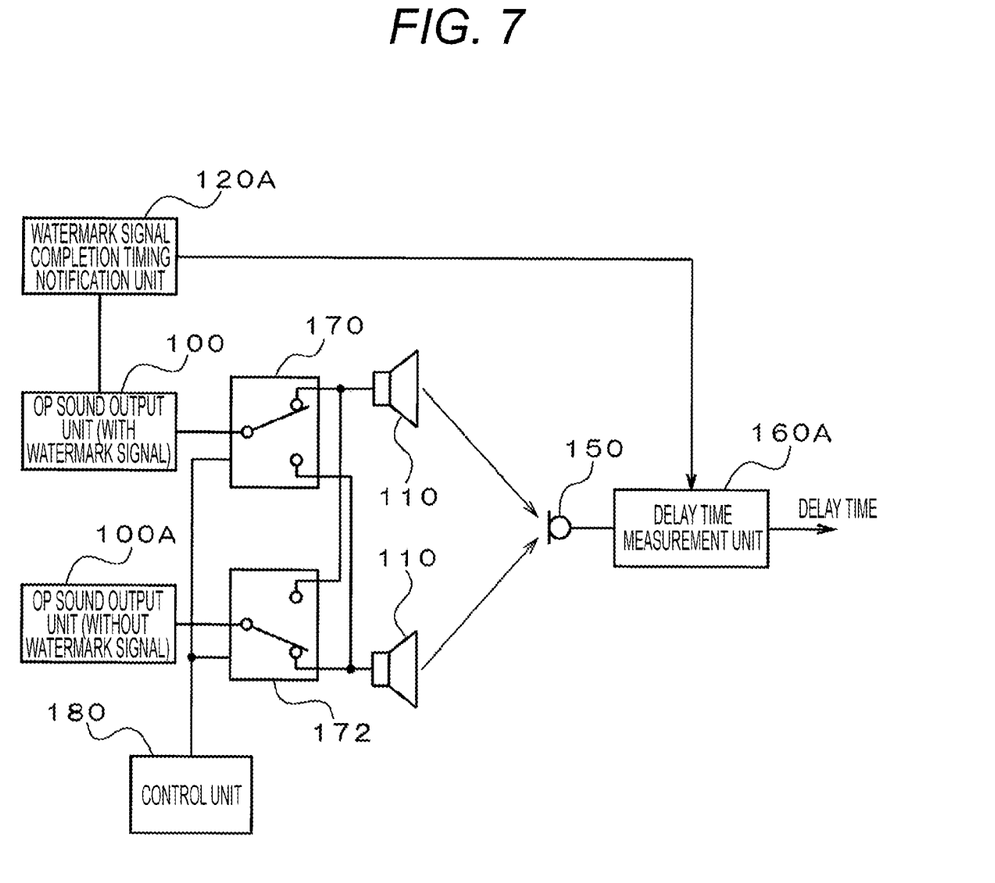
FIG. 7 is a diagram illustrating another modification example of measuring the delay time.

FIG. 7 is a diagram illustrating another modification example of measuring the delay time. An acoustic characteristic measurement device illustrated in FIG. 7 measures a delay time of an acoustic signal from each of two speakers 110 to the microphone 150 and includes a set of the opening sound output unit 100 and the watermark signal completion timing notification unit 120A, an opening sound output unit 100A outputting an opening sound in which the watermark signal is not embedded, and two changing-over switches 170 and 172, and a control unit 180.

In such an acoustic characteristic measurement device, the delay time of the acoustic signal from one speaker 110 to the microphone 150 is measured according to the output of a first opening sound, and the delay time of the acoustic signal from the other speaker 110 to the microphone 150 is measured according to the output of a second opening sound. The control unit 180 changes over two changing-over switches 170 and 172 to each other, and thus, the opening sound in which the watermark signal is embedded is output from one speaker 110, and the opening sound in which the watermark signal is not included is output from the other speaker 110, at the time of the first opening sound output. Accordingly, the delay time from one speaker 110 in which the watermark signal is embedded to the microphone 150 is measured. In addition, the control unit 180 changes over two changing-over switches 170 and 172 to each other, and thus, the opening sound in which the watermark signal is embedded is output from the other speaker 110, and the opening sound in which the watermark signal is not included is output from one speaker 110, at the time of the second opening sound output. Accordingly, the delay time from the other speaker 110 in which the watermark signal is embedded to the microphone 150 is measured.

However, in the embodiment described above, notification of the output timing when the watermark signal embedded in the opening sound, which is output from the opening sound output unit 100, is output from the speaker 110 is provided to the acoustic characteristic measurement unit 160 (the delay time measurement unit 160A) by the watermark signal timing notification unit 120 (the watermark signal completion timing notification unit 120A), but the notification of the output timing may be provided to the acoustic characteristic measurement unit 160 (the delay time measurement unit 160A) by including the same signal in the watermark signal.

Figure 8:
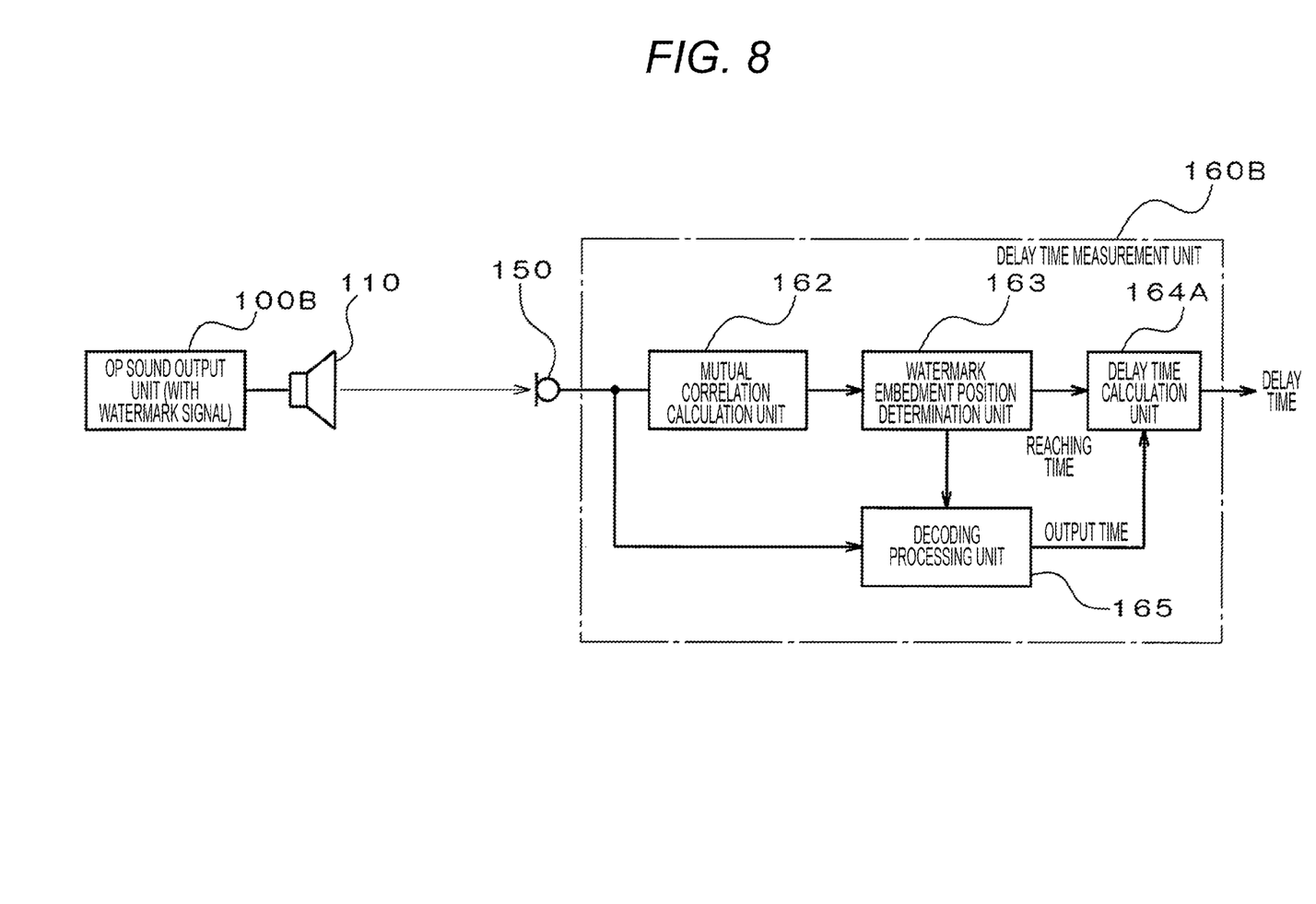
FIG. 8 is a diagram illustrating a modification example of measuring the delay time in which notification of an output timing of the watermark signal is provided by being included in the watermark signal.

FIG. 8 is a diagram illustrating a modification example of measuring the delay time in which notification of the output timing of the watermark signal is provided by being included in the watermark signal. The acoustic characteristic measurement device illustrated in FIG. 8 includes an opening sound output unit 100B, the speaker 110, the microphone 150, and a delay time measurement unit 160B.

The opening sound output unit 100B outputs an opening sound in which the output timing of the embedded watermark signal is included in its own watermark signal. In a case where the acoustic characteristic measurement device (the onboard device) is activated and the time at this time point is known, an output time of the opening sound is also known, and thus, the output timing of the watermark signal to be embedded in a predetermined position of the opening sound (for example, an output completion time T0) is calculated, and the output completion time of the watermark signal can be included in the watermark signal.

Figure 9:
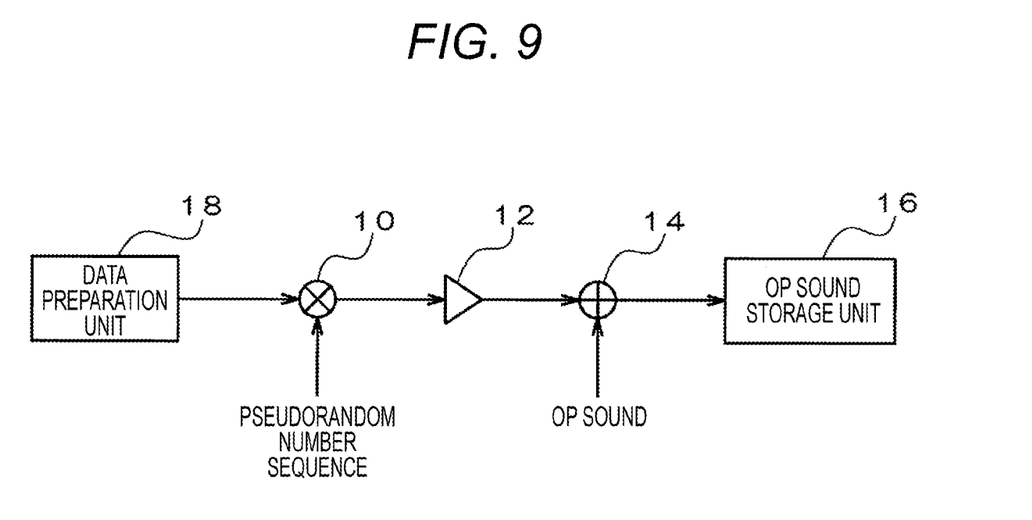
FIG. 9 is a diagram illustrating a configuration of generating the opening sound in which the watermark signal including its own output completion time is embedded.

FIG. 9 is a diagram illustrating a configuration of generating the opening sound in which the watermark signal including the output completion time is embedded. In the configuration illustrated in FIG. 9, a data preparation unit 18 is added to the configuration illustrated in FIG. 4. The data preparation unit 18 inputs data of a predetermined number of bits indicating the output completion time of the watermark signal to the multiplier 10. The processing subsequent to the processing of the multiplier 10 is identical to the configuration illustrated in FIG. 4, and thus, the opening sound in which the watermark signal including the output completion time is embedded is stored in the opening sound storage unit 16.

The opening sound output unit 100B illustrated in FIG. 8 reads out the opening sound stored in the opening sound storage unit 16 at a predetermined timing (a timing when the output completion timing of the watermark signal is coincident with the output completion time T0 included in the data of the watermark sound) and outputs the opening sound from the speaker 110.

The delay time measurement unit 160B measures the delay time of the acoustic signal in the acoustic space from the speaker 110 to the microphone 150 on the basis of the embedment position of the watermark signal embedded in the opening sound which is subjected to the sound collection by the microphone 150 and the output completion time T0 included in the watermark signal.

As illustrated in FIG. 8, the delay time measurement unit 160B includes the mutual correlation calculation unit 162, the watermark embedment position determination unit 163, a delay time calculation unit 164A, and a decoding processing unit 165. The same reference numerals will be applied to the same components as those of FIG. 3, and the description thereof will be omitted except for when it is necessary. In addition, similar reference numerals will be applied to components corresponding to the components illustrated in FIG. 3.

The watermark embedment position determination unit 163 determines the target portion in which the correlation value to be calculated by the mutual correlation calculation unit 162 is maximized, as a specific embedment position of the watermark signal in the opening sound, and specifies a time T1 when the capturing of the watermark signal in the microphone 150 is completed.

The decoding processing unit 165 decompresses the data included in the embedded watermark signal (the output completion time T0) on the basis of the opening sound which is output from the microphone 150 and is subjected to the sound collection.

Figure 10:
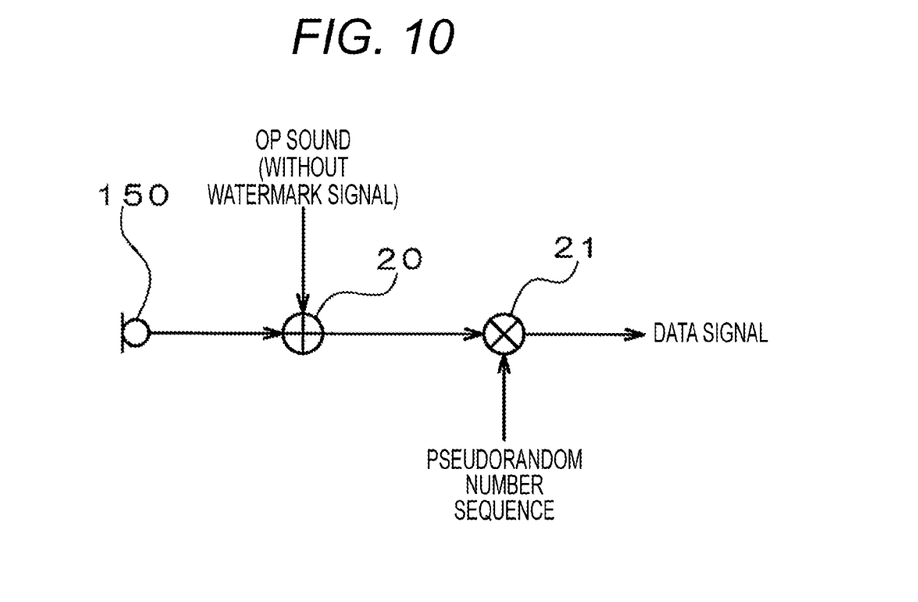
FIG. 10 is a diagram illustrating data decompression of a decoding processing unit.

FIG. 10 is a diagram illustrating the data decompression of the decoding processing unit 165. As described above, in a case where the watermark embedment position determination unit 163 determines a time point when the capturing of the watermark signal is completed (a time t13), it is possible to identify a portion corresponding to the watermark signal in the opening sounds input into the microphone 150 immediately before the time point, on the basis of the time point. The adder 20 subtracts a second opening sound not including the watermark signal, corresponding to the same position as the identified portion, from a first opening sound of the identified portion (for example, the opening sound to be output from the microphone 150 can be stored once in a storage unit (not illustrated), and can be read out after the portion is identified), and thus, extracts the watermark signal embedded in the opening sound. The multiplier 21 multiplies the extracted watermark signal and the pseudorandom number sequence used for preparing the watermark signal together, and performs despreading processing with respect to the spectrum spreading, and thus decompresses the data. Furthermore, in practice, in a case where each of the bits of the data is represented by eight samples, second data of a predetermined number of bits is decompressed by averaging the amplitudes for each data rate corresponding to eight samples.

The delay time calculation unit 164A subtracts the time T0 represented by the data decompressed by the decoding processing unit 165 (the output completion time T0 when the watermark signal is output from the speaker 110) from the time T1 specified by the watermark embedment position determination unit 163 (a time when the watermark signal reaches the microphone 150), and thus calculates the delay time T of the acoustic signal from the speaker 110 to the microphone 150, which is a difference between the time T0 and the time T1.

Thus, the output time is included in the watermark signal, and it is not necessary to provide notification of the same type of information in another system, and it is possible to simplify the configuration.

Furthermore, even in a combination in a case of a plurality of speakers 110, in a case of a plurality of microphones 150, or the like, the output time is included in the watermark signal, and thus, similarly, it is possible to calculate the delay time with respect to the combination of each of the speakers and each of the microphones. In addition, in a method of identifying which watermark signal is included in the opening sound output from which speaker, the watermark signal may be identified on the basis of a pseudorandom code sequence to be used for preparing the watermark signal, or may be identified by including the ID of the speaker or the like in the data of the watermark signal.

(2) Measurement of Acoustic Transmission Characteristic (Frequency Response Function)

Figure 11:
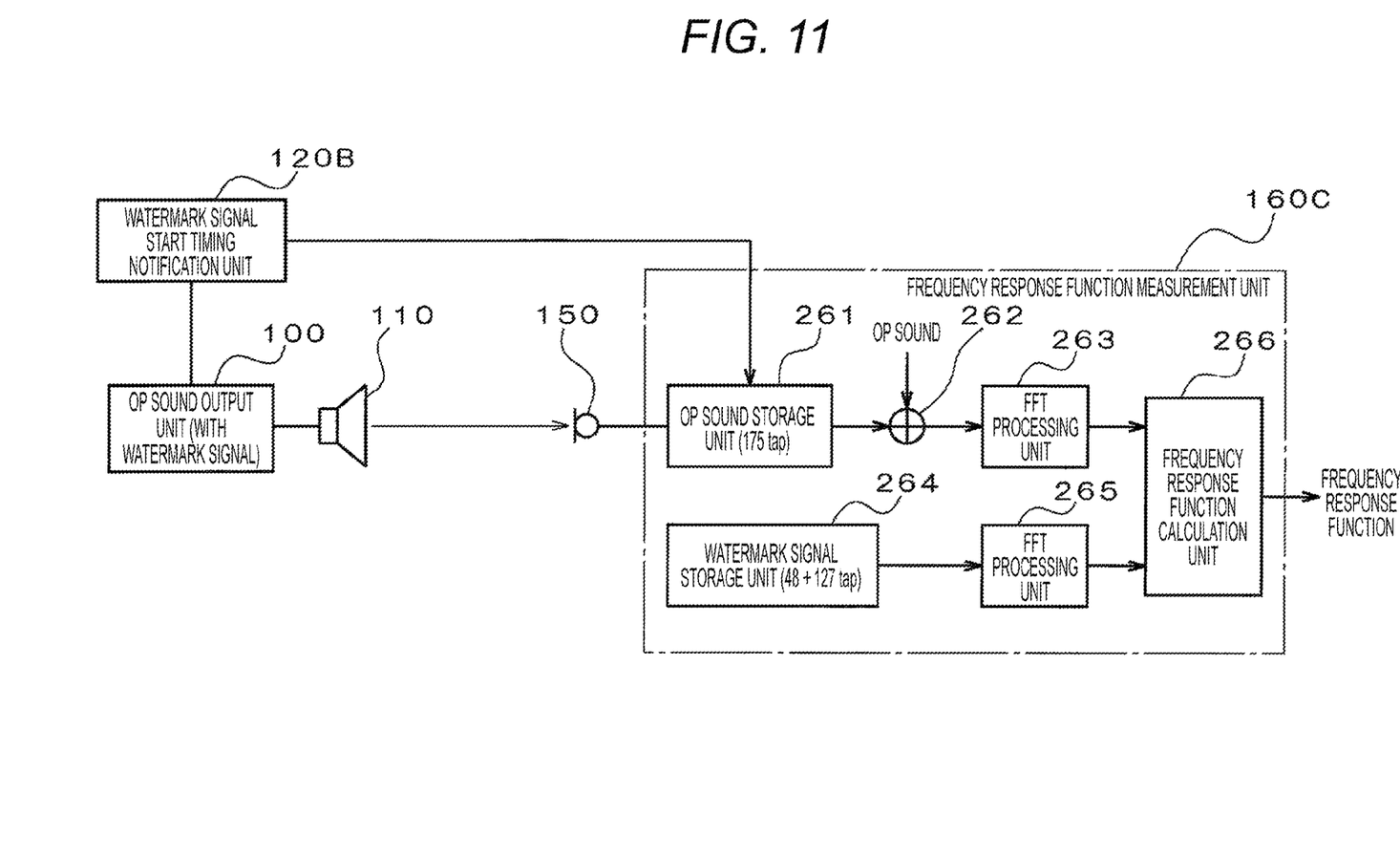
FIG. 11 is a diagram illustrating a configuration of the acoustic characteristic measurement device measuring an acoustic transmission characteristic.

FIG. 11 is a diagram illustrating the configuration of the acoustic characteristic measurement device measuring the acoustic transmission characteristic. The same reference numerals will be applied to the same components as those of FIG. 1, and the description thereof will be omitted except for when it is necessary. In addition, similar reference numerals will be applied to components corresponding to the components illustrated in FIG. 1.

An acoustic characteristic measurement device illustrated in FIG. 11 includes the opening (OP) sound output unit 100, the speaker 110, a watermark signal start timing notification unit 120B, the microphone 150, and a frequency response function measurement unit 160C.

The watermark signal start timing notification unit 120B outputs output start notification of the watermark signal to the frequency response function measurement unit 160C when the output of the embedded watermark signal is started while the opening sound is output from the speaker 110 (at the time point of t2 in FIG. 2 or FIG. 5).

The frequency response function measurement unit 160C measures the acoustic transmission characteristic (the frequency response function) of the acoustic signal in the acoustic space from the speaker 110 to the microphone 150 on the basis of the watermark signal embedded in the opening sound which is subjected to the sound collection by the microphone 150, according to the notification of the watermark signal start timing notification unit 120B.

As illustrated in FIG. 11, the frequency response function measurement unit 160C includes an opening (OP) sound storage unit 261, an adder 262, fast Fourier transform (FFT) processing units 263 and 265, a watermark signal storage unit 264, and a frequency response function calculation unit 266. The watermark signal start timing notification unit 120B corresponds to a watermark signal timing notification unit, the opening sound storage unit 261 and the adder 262 correspond to a watermark signal extraction unit, and the FFT processing units 263 and 265, the watermark signal storage unit 264, and the frequency response function calculation unit 266 correspond to a frequency response function calculation unit.

The opening sound storage unit 261 starts a storage operation when the output start notification of the watermark signal is output from the watermark signal start timing notification unit 120B, and stores the opening sound which is subjected to the sound collection by the microphone 150, by a predetermined number of taps (the number of samples). For example, as described above by using FIG. 4, in a case where the number of bits of the data is set to 6 and a data rate length of one bit is set to 50 ms in eight samples, the opening sound of 175 taps (=1093.75 ms) is stored in the opening sound storage unit 261 in a case where the entire data of 6 bits is 300 ms in 48 samples (48 taps).

The adder 262 subtracts the opening sound in which the watermark signal is not embedded (the second opening sound) from the opening sound stored in the opening sound storage unit 261 (the first opening sound), and thus, extracts a component corresponding to the watermark signal from the opening sounds which are subjected to the sound collection by the microphone 150. The FFT processing unit 263 calculates discrete Fourier transform of the watermark signal output from the adder 262 (the watermark signal which is subjected to the sound collection by the microphone 150), by performing fast Fourier transform.

The watermark signal storage unit 264 stores the watermark signal embedded in the opening sound to be output from the speaker 110, and a predetermined number of zero data items. Specifically, for example, as with the opening sound storage unit 261, the watermark signal of 174 taps (the watermark signal before passing through the acoustic space by being output from the speaker 110) is stored by the watermark signal of 48 taps to be output from the multiplier 10 of FIG. 4 and the zero data added by zero padding of 127 samples (taps). The FFT processing unit 265 calculates the discrete Fourier transform of the watermark signal read out from the watermark signal storage unit 264 (the watermark signal output from the speaker 110) by performing the fast Fourier transform.

The frequency response function calculation unit 266 calculates the acoustic transmission characteristic (the frequency response function) corresponding to the acoustic space from the speaker 110 to the microphone 150, on the basis of an FFT result of the FFT processing unit 263 corresponding to the watermark signal reaching the microphone 150, and an FFT result of the FFT processing unit 265 corresponding to the watermark signal output from the speaker 110, specifically, by dividing one FFT result by the other FFT result.

Thus, it is possible to calculate the acoustic transmission characteristic of the acoustic space by checking two types of watermark signals to be input and output, before and after the acoustic space from the speaker 110 to the microphone 150. In particular, it is possible to obtain the acoustic transmission characteristic (the frequency response function) indicating a change in the amplitude and the phase for each frequency when the acoustic signal passes through the acoustic space, by using the FFT processing units 263 and 265.

Furthermore, even in a combination in a case of a plurality of speakers 110 in a case of a plurality of microphones 150, or the like, it is similarly possible to measure the acoustic transmission characteristic on the basis of a one-to-one combination of each of the speakers 110 and each of the microphones 150. In addition, a case of the plurality of speakers 110 is identical to the delay time measurement described above, in that it is possible to measure the acoustic transmission characteristics of the acoustic space from each of the speakers 110 to the microphone 150 in parallel with each other, by using opening sounds in which a plurality of watermark signals having different contents and output timings are respectively embedded, and it is possible to reduce the processing load by sequentially and selectively outputting the opening sounds using the same watermark signal from each of the speakers 110, and by sequentially measuring the acoustic transmission characteristics of the acoustic space from each of the speakers 110 to the microphone 150.

The present invention is not limited to the embodiments described above. For example, in the embodiments described above, a case of measuring the delay time or the acoustic transmission characteristic of the acoustic signal in the acoustic space between the speaker 110 and the microphone 150 which are used in the onboard device mounted on the vehicle has been described, but the present invention may be applied to a case of measuring the delay time or the acoustic transmission characteristic in an acoustic space other than a vehicle.

In addition, in the embodiments described above, the opening sound of which the contents are fixed in advance is used, but the delay time or the acoustic transmission characteristic may be measured by embedding the watermark signal in the acoustic signal of which the contents are changed, such as the audio sound to be output from the audio device.

Figure 12:
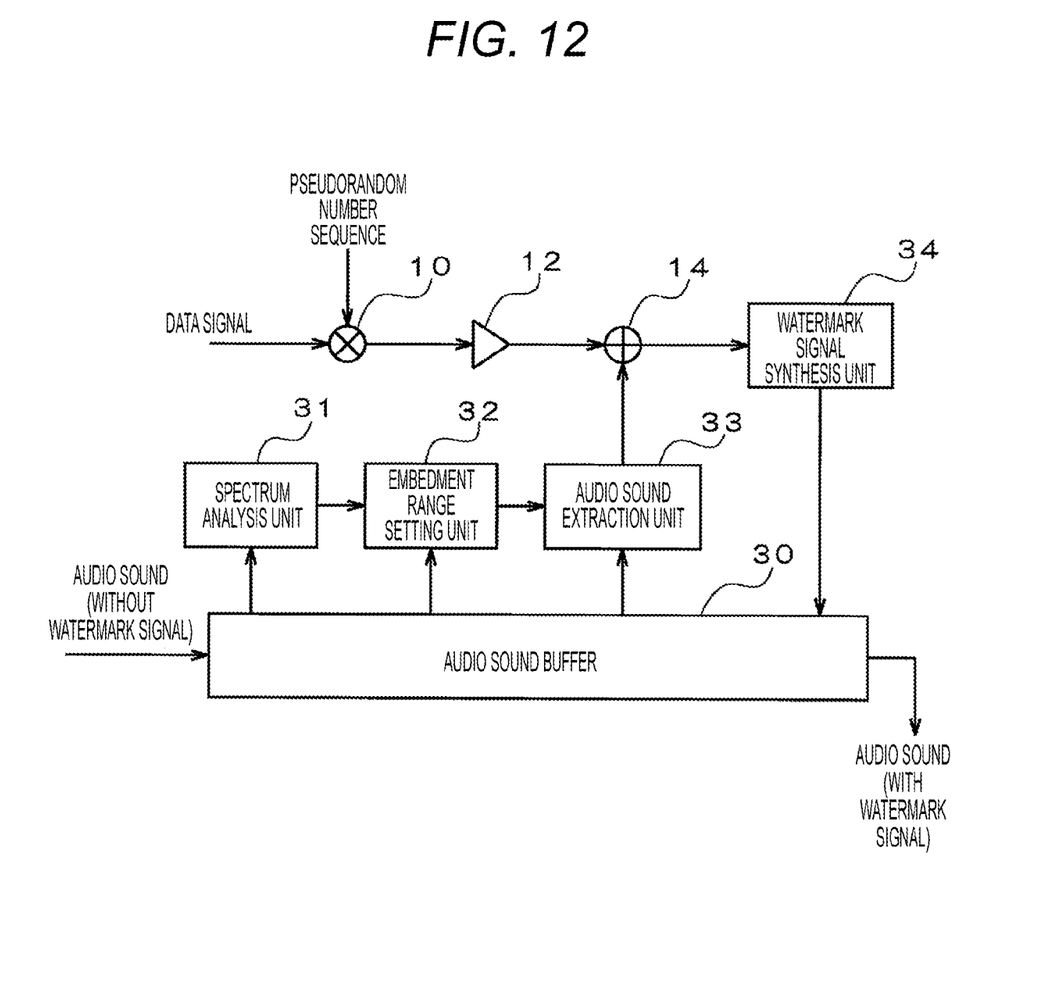
FIG. 12 is a diagram illustrating a configuration of embedding the watermark signal in the audio sound.

FIG. 12 is a diagram illustrating a configuration of embedding the watermark signal in the audio sound. In the configuration illustrated in FIG. 12, an audio sound buffer 30, a spectrum analysis unit 31, an embedment range setting unit 32, an audio sound extraction unit 33, and a watermark signal synthesis unit 34 are added to the configuration illustrated in FIG. 4. The spectrum analysis unit 31 and the embedment range setting unit 32 correspond to an embedment propriety determination unit, and the multiplier 10, the level adjuster 12, the adder 14, the audio sound extraction unit 33, and the watermark signal synthesis unit 34 correspond to an acoustic signal preparation unit.

The audio sound buffer 30 temporarily stores the audio sound before being output from the speaker 110. The spectrum analysis unit 31 performs spectrum analysis with respect to the audio sound stored in the audio sound buffer 30. The embedment range setting unit 32 sets the range of the audio sound in which a signal component of greater than or equal to a predetermined level exists in the entire region of an audible band, as an embedment range of the watermark signal, on the basis of an analysis result of the spectrum analysis unit 31. As described above, the watermark signal prepared by the spectrum spreading method is spread over a wide frequency range, and thus, in order to mask the watermark signal it is necessary for the audio sound in which the watermark signal is embedded to include the signal component over a wide frequency range. The spectrum analysis unit 31 and the embedment range setting unit 32 extract a part of the audio sound suitable for such an application. Furthermore, even in a case of not satisfying a condition in which the signal component of greater than or equal to a predetermined level exists in the entire region of the audible band, the range of the audio sound may be set as the embedment range of the watermark signal in a case where a masking effect of a level in which the watermark signal is not heard by the user from the spectrum of the audio signal can be expected.

The audio sound extraction unit 33 extracts a partial audio sound corresponding to the embedment range of the watermark signal, which is set by the embedment range setting unit 32, from the audio sound buffer 30. The partial audio sound is input into the adder 14, and the watermark signal to be output from the level adjuster 12 is embedded in the partial audio sound. The watermark signal synthesis unit 34 performs synthesis processing of the audio sound of substituting the partial audio sound in which the watermark signal is embedded with the audio sound before the watermark signal is embedded. According to the synthesis processing, the audio sound after the watermark signal is embedded is read out from the audio sound buffer 30 and is output from the speaker 110.

Thus, the watermark signal is embedded in the audio sound or the like, and it is possible to select an acoustic signal suitable for the measurement of the acoustic characteristic from the acoustic signals to be used in the normal operation at each time.

As described above, according to the present disclosure, the acoustic characteristic of the acoustic space from the speaker to the microphone is measured by using the watermark signal, and thus, it is possible to perform the normal operation using the acoustic signal and the measurement operation of the acoustic characteristic in parallel with each other, and a time only for measuring the acoustic characteristic is not required. In addition, the watermark signal is embedded in the acoustic signal, and thus, the user is not particularly conscious of the signal for measuring the acoustic characteristic, and it is possible to prevent the user from feeling discomfort.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. An acoustic characteristic measurement device comprising:
    a speaker configured to output an acoustic signal in which a watermark signal is embedded;
    a microphone configured to perform sound collection with respect to the acoustic signal output from the speaker in a predetermined listening position; and
    an acoustic characteristic determination unit configured to determine an acoustic characteristic of an acoustic space from the speaker to the listening position, on the basis of the watermark signal embedded in the acoustic signal which is subjected to the sound collection by the microphone;
    wherein the acoustic characteristic determination unit includes a watermark signal extraction unit configured to extract the watermark signal embedded in the acoustic signal which is subjected to the sound collection by the microphone and a frequency response function calculation unit configured to calculate a frequency response function as the acoustic characteristic, on the basis of a first watermark signal as the watermark signal included in the acoustic signal output from the speaker and a second watermark signal as the watermark signal extracted by the watermark signal extraction unit.

2. The acoustic characteristic measurement device according to claim 1, further comprising a watermark signal timing notification unit configured to provide notification of an output timing when the watermark signal embedded in the acoustic signal is output from the speaker,
    wherein the acoustic characteristic determination unit determines the acoustic characteristic according to the notification of the watermark signal timing notification unit.

3. The acoustic characteristic measurement device according to claim 2, wherein the acoustic characteristic determination unit includes a watermark embedment position determination unit configured to detect an embedment position of the watermark signal in the acoustic signal subjected to the sound collection by the microphone, and a delay time calculation unit configured to calculate a delay time of the acoustic signal in the acoustic space, as the acoustic characteristic, on the basis of the notification of the watermark signal timing notification unit and a determination result of the watermark embedment position determination unit.

4. The acoustic characteristic measurement device according to claim 3, wherein the watermark embedment position determination unit detects the embedment position of the watermark signal by calculating a mutual correlation between the acoustic signal subjected to the sound collection by the microphone and the watermark signal.

5. The acoustic characteristic measurement device according to claim 4, wherein the watermark signal timing notification unit provides notification of a first timing when the output of the watermark signal from the speaker is completed,
    the watermark embedment position determination unit determines a second timing when capturing of the watermark signal by the microphone is completed by detecting the embedment position of the watermark signal, and
    the delay time calculation unit calculates a difference between the first timing and the second timing as the delay time.

6. The acoustic characteristic measurement device according to claim 5, wherein the watermark signal timing notification unit includes a time when the watermark signal is output from the speaker, in the watermark signal, as the output timing.

7. The acoustic characteristic measurement device according claim 1, wherein the frequency response function calculation unit calculates the frequency response function by calculating discrete Fourier transform of each of the first watermark signal and the second watermark signal.

8. The acoustic characteristic measurement device according to claim 7, wherein the watermark signal timing notification unit provides notification of a third timing when the output of the watermark signal from the speaker is started, and the frequency response function calculation unit calculates a frequency response function from the first watermark signal and the second watermark signal according to the third timing.

9. The acoustic characteristic measurement device according to claim 8, wherein the watermark signal is generated by using a spectrum spreading method.

10. The acoustic characteristic measurement device according to claim 9, wherein the watermark signal is generated by multiplying predetermined data and pseudo-random number sequence data together.

11. The acoustic characteristic measurement device according to claim 10, further comprising:

an acoustic signal storage unit configured to store the acoustic signal in which the watermark signal is embedded; and an acoustic signal output unit configured to read out the acoustic signal from the acoustic signal storage unit and to output the acoustic signal from the speaker.

12. The acoustic characteristic measurement device according to claim 11, wherein the acoustic signal storage unit stores the acoustic signal which is prepared in advance and of which contents are not changed every time when the acoustic signal is read out.

13. The acoustic characteristic measurement device according to claim 10, further comprising:

an embedment propriety determination unit configured to determine propriety of the embedment of the watermark signal according to input of an acoustic signal to be embedded, as an acoustic signal before the watermark signal is embedded; and an acoustic signal preparation unit configured to prepare the acoustic signal by embedding the watermark signal in the acoustic signal to be embedded, which is determined as suitable for the embedment of the watermark signal by the embedment propriety determination unit.

14. The acoustic characteristic measurement device according to claim 13, wherein the embedment propriety determination unit determines that the acoustic signal to be embedded is suitable for the embedment of the watermark signal in a case in which a level of a frequency component with respect to an audible band is greater in the acoustic signal to be embedded than in the embedded signal.

15. The acoustic characteristic measurement device according claim 1, wherein the frequency response function calculation unit calculates discrete Fourier transform of each of the first watermark signal and the second watermark signal by fast Fourier transform.

16. An acoustic characteristic measurement method comprising:

outputting an acoustic signal in which a watermark signal is embedded, from a speaker;

performing sound collection with respect to the acoustic signal output from the speaker in a predetermined listening position, by a microphone; and determining an acoustic characteristic of an acoustic space from the speaker to the listening position, on the basis of the watermark signal embedded in the acoustic signal which is subjected to the sound collection by the microphone, by an acoustic characteristic determination unit;

wherein the acoustic characteristic determination unit includes extracting the watermark signal embedded in the acoustic signal which is subjected to the sound collection by the microphone and calculating a frequency response function as the acoustic characteristic, on the basis of a first watermark signal as the watermark signal included in the acoustic signal output from the speaker and a second watermark signal as the extracted watermark signal.

17. The acoustic characteristic measurement method according to claim 16, further comprising:

providing notification of an output timing when the watermark signal embedded in the acoustic signal is output from the speaker, wherein the acoustic characteristic is determined according to the notification.

18. The acoustic characteristic measurement method according to claim 17, further comprising:

detecting an embedment position of the watermark signal in the acoustic signal subjected to the sound collection by the microphone, and calculating a delay time of the acoustic signal in the acoustic space, as the acoustic characteristic, on the basis of the notification of the watermark signal output timing and the detection of the watermark embedment position.

19. The acoustic characteristic measurement method according to claim 18, wherein the embedment position of the watermark signal is detected by calculating a mutual correlation between the acoustic signal subjected to the sound collection by the microphone and the watermark signal.

* * * * *